United States Patent [19]
Miller

[11] Patent Number: 5,116,410
[45] Date of Patent: May 26, 1992

[54] WASHABLE DYE-CONTAINING COMPOSITION

[75] Inventor: Richard E. Miller, Nazareth, Pa.
[73] Assignee: Binney & Smith Inc., Easton, Pa.
[21] Appl. No.: 613,922
[22] Filed: Nov. 5, 1990

Related U.S. Application Data

[63] Continuation-in-part of Ser. No. 335,272, Apr. 10, 1989, abandoned.

[51] Int. Cl.$^5$ .............................................. C09D 11/16
[52] U.S. Cl. ....................................... 106/22; 106/19; 8/589
[58] Field of Search ................ 106/19, 22; 8/589, 588

[56] References Cited

U.S. PATENT DOCUMENTS 4,908,149  3/1990  Moore et al. .................... 252/174.23

FOREIGN PATENT DOCUMENTS 165465  7/1988  Japan .
165468  7/1988  Japan .

Primary Examiner—William R. Dixon, Jr.
Assistant Examiner—Helene Klemanski
Attorney, Agent, or Firm—Leydig, Voit & Mayer

[57] ABSTRACT

In one form, the invention is a washable dye-containing composition comprising an acid dye, a dye vehicle, and an organic sulfonate in an amount of at least about 10% by weight of the composition. More specifically, the invention is, in one preferred embodiment, a washable marker ink, comprising an acid dye, water, and an aromatic sulfonate in an amount of at least about 10% by weight of the composition. In another embodiment, the composition of the invention is in the form of a water-soluble tempera paint comprising an acid dye, water, fillers, thickeners, opacifiers, and an organic sulfonate in an amount of at least about 10% by weight of the composition. Other water-soluble dye-containing compositions having enhanced skin and fabric fugitivity are within the scope of the invention as well.

16 Claims, No Drawings

WASHABLE DYE-CONTAINING COMPOSITION

This application is a continuation-in-part of my prior application, Ser. No. 07/335,272, filed Apr. 10, 1989, now abandoned.

BACKGROUND OF THE INVENTION

1. Field of the Invention

This invention relates generally to the field of water soluble coloring materials for drawing, painting, and coloring purposes, such as marker inks and paints. In one particular aspect, the invention relates to marking instruments containing liquid inks, and it more specifically relates to the formulation of inks for use in marking pens or, simply, markers. In one preferred form, the invention relates to improvements in coloring and drawing markers for use by young children.

2. Brief Description of the Prior Art

Children's coloring markers usually contain inks which are aqueous solutions of dyes known in the trade as "acid dyes." The term "acid dyes" is actually somewhat of a misnomer in that it does not describe any particular chemical type of dye, but rather refers to the traditional practice of dyeing fabrics from acidified solutions. Not all acid dyes are suitable for use in marker inks, however, and dyes having good chroma and color intensity and good water-solubility characteristics are typically utilized.

Marker inks ordinarily also include such ingredients as humectants, biocides, and surfactants. Humectants function to improve freeze/thaw stability and to control drying out of the marker tip, while biocides serve the obvious function of preventing spoilage of the ink during the expected shelf life of the marker product. In order to limit a grainy appearance of the ink as it is applied and/or to enhance the flow characteristics of the ink, a small amount of surfactant is ordinarily employed. It is important to note that surfactants, when used at all, are included in very low concentrations in marker inks in order to prevent the phenomenon known as "strike-through," where the ink soaks through the paper to which it is applied instead of remaining on the surface.

It is well known that a major deficiency of children's coloring markers is their propensity to leave enduring stains on both skin and clothing. While permanence is a desirable characteristic of the so-called "permanent" markers, it is one of the most objectionable of properties for coloring instruments used by young children. Accordingly, much effort has been expended over many years by producers of these instruments to reduce or eliminate staining. This is attested to by the rather numerous offerings of so-called "washable" markers, which on close examination, are found to remove very poorly from fabrics that are typically used in children's clothing. Most such markers achieve their limited washability by utilizing dyes which have good fugitivity from fabrics and by utilizing lowered dye concentrations in an effort to minimize skin staining. In all cases, however, these "washable" products leave objectionable stains on the skin. The inks used in such markers therefore lack fugitivity from skin.

In a more recent approach, the tints or dyes used in these "washable" markers are produced by the chemical grafting of a chromophore onto a water soluble polymer, such as polyethylene glycol, in an effort to impart improved fugitivity properties to the chromophore. While this approach is a workable one for enhancing fabric fugitivity, it is relatively expensive.

It is therefore one general object of the invention to provide a method of imparting skin fugitivity to a dye-containing composition.

Another object is to provide a water-soluble dye-containing composition which, in addition to being washable from the skin, is more easily washable from fabrics.

A related object is to provide non-toxic washable dye-containing compositions, such as paints and inks, which are suitable for use by young children who may make marks on themselves and their clothing.

Another related object is to impart skin fugitivity to dye-containing compositions without the necessity for chemical or other alteration of the dyestuff itself.

A further object is to impart skin fugitivity to dye-containing compositions which otherwise have good washability from textiles, but quite limited washability from skin.

These and other objects and advantages of the invention will be apparent to those skilled in this art from the following description of the invention and the appended claims.

SUMMARY OF THE INVENTION

The discovery of the present invention is that one may incorporate into a water-soluble acid dye-containing composition an additive which will impart to the composition fugitivity from skin. At the same time, it has been discovered that, in many instances, the additive will noticeably enhance fugitivity from fabrics ordinarily used in children's clothing. Thus, in accordance with the present invention, one may produce a water-soluble acid dye-containing composition which has unexpectedly good fugitivity from skin and, in many instances, enhanced fugitivity from textiles without the need for chemically altering the desired dye.

In a first respect, the discovery is that a material otherwise known for its dispersant properties, namely, an organic sulfonate, is effective to impart fugitivity from skin. And, as noted, this material may also enhance the fugitivity from fabrics of an acid dye-containing composition. In a second respect, the discovery is that these unexpected results are achieved by the use of high concentrations of the organic sulfonate, inasmuch as such materials have traditionally been employed in rather low concentrations as dye dispersants and as tanning agents for leather.

In one of its most general aspects, the invention includes acid dye-containing compositions including an organic sulfonate which are easily washed from the skin, and, in addition, are also more easily washed from textiles. In another general aspect, the present invention includes a method of imparting skin fugitivity to an acid dye-containing composition by adding to the composition an effective amount of an organic sulfonate.

Thus, in one form, the invention is a washable dye-containing composition comprising an acid dye, a dye vehicle, and an organic sulfonate in an amount of at least about 10% by weight of the composition. More specifically, the invention is, in one preferred embodiment, a washable dye-containing composition, such as a marker ink, comprising an acid dye, water, and an aromatic sulfonate in an amount of at least about 10% by weight of the composition. Such a marker ink, which is especially suitable for use by children, also advantageously includes a humectant, a surfactant, and a preservative, all as are well known in the art. In another embodiment, the composition of the invention is in the form of a water-soluble tempera paint comprising an acid dye, water, fillers, thickeners, opacifiers, and an organic sulfonate in an amount of at least about 10% by weight of the composition.

DETAILED DESCRIPTION

The additive which has now been discovered to impart skin fugitivity and, in some instances, enhance fabric fugitivity of water-soluble dye-containing compositions when utilized in rather high concentrations; namely, an organic sulfonate, has long been used at low concentrations as a dispersant and as a tanning agent for leather. All organic sulfonates are, in general, effective in the practice of the invention. Even lignin sulfonates are effective, though they tend to affect the color of the composition. In general, aromatic sulfonates are preferred for use in the marker ink compositions of the invention. Aliphatic sulfonates impart adequate fugitivity, but marker ink compositions which include them tend to produce the undesirable "strike-through" effect mentioned above, and they are therefore less preferred for such use. In addition, it is preferred to use those sulfonates which, in addition to imparting fugitivity from skin, also enhance fugitivity from textiles.

The specific mechanism by which the sulfonates impart skin fugitivity and enhance fabric fugitivity is not known; however, it is believed that the sulfonates tie up the reactive site of the chromophore molecule, such that the chromophore has a reduced ability to physically or chemically associate with skin or fabric.

It has been found, moreover, that simply sulfonating the dye molecule, much like grafting onto it a water soluble polymer, enhances water solubility, but confers no skin fugitivity.

Both monomeric and polymeric organic sulfonates are useful in the invention, though the monomeric materials are somewhat less effective. The identity of the cation does not appear to have any significance with respect to the effectiveness of the additive.

Each of the aromatic sulfonates listed in Table I exhibited the effect of imparting skin fugitivity and enhancing fabric fugitivity. These are listed merely by way of example; other organic sulfonates may produce equivalent or even better results, and all are within the scope of this invention.

Each material listed in Table I was tested in a composition comprising, by weight, 75 parts deionized water, 25 parts of the organic sulfonate additive, and 4 parts Acid Blue #9. The results of that test are summarized in Table II.

TABLE I

| Additive (Source) | Chemical Description |
| --- | --- |
| Aristonate 430 (Pilot Chemical Co.) | sodium alkyl benzene sulfonate |
| Aristonate 460 (Pilot Chemical Co.) | sodium alkyl benzene sulfonate |
| Aristonate 500 (Pilot Chemical Co.) | sodium alkyl benzene sulfonate |
| Blancol N (GAF Corp.) | sodium salt of sulfonated naphthalene - formaldehyde condensate |
| Conco Sulfate 2A1 (Continental Chemical Co.) | sodium alkyl diphenyl oxide sulfonate |
| Darvan #2 (R. T. Vanderbilt Co.) | sodium salts of polymerized substituted benzoid alkyl sulfonic acids |

TABLE I-continued

| Additive (Source) | Chemical Description |
| --- | --- |
| Darvan 404 (R. T. Vanderbilt Co.) | calcium salts of polymerized substituted benzoid alkyl sulfonic acids |
| Daxad 11 (W. R. Grace Co.) | sodium salts of polymerized alkyl naphthalenic sulfonic acids |
| Daxad 17 (W. R. Grace Co.) | sodium salts of polymerized alkyl naphthalenic sulfonic acids |
| Daxad 19 (W. R. Grace Co.) | sodium salts of polymerized alkyl naphthalenic sulfonic acids |
| Daxad 23 (W. R. Grace Co.) | sodium salts of polymerized alkyl naphthalenic sulfonic acids with substituted benzoid alkyl sulfonic acids |
| Kara Sperse DDL (Lyndal Chemical Co.) | sodium organic sulfonate |
| Kara Sperse DDL-12 (Lyndal Chemical Co.) | modified sulfonate |
| Lomar D (Diamond Shamrock Co.) | sodium salt of condensed mono naphthalenic sulfonic acids |
| Lomar LS (Diamond Shamrock Co.) | sodium salt of condensed mono naphthalenic sulfonic acids |
| Petro-D-425 (DeSoto Inc.) | sodium salt of sulfonated naphthalene formaldehyde condensate |
| Stepantan A (Stepan Co.) | condensed naphthalene sulfonate |
| Tamol SN (Rohm & Haas Co.) | sodium salt of condensed naphthalene sulfonic acids |
| Turkey red oil | sulfated castor oil |

In general, it has been found that the beneficial effect of the organic sulfonate additive occurs when the additive is present at a concentration of at least about 10% by weight of the composition. The weight ratio of additive to dye appears not to be critical. The upper limit of the additive concentration is imposed only by the constraints on the viscosity of the composition in view of the fact that many organic sulfonates are solids. For example, a marker ink cannot have a significantly viscous consistency or it will not flow through a marker nib. Moreover, the maximum preferred concentration is about 25% by weight of the composition, since there is no observable benefit from higher concentrations.

It has been found that the addition of an organic sulfonate produces skin fugitivity and may enhance fabric fugitivity when used with acid dyes. However, the use of the organic sulfonate with basic and direct dyes tends to cause precipitates which are highly undesirable in dye-containing compositions such as inks. Also, basic dyes tend to be more toxic than acid dyes, thus rendering their use in products for children less desirable. In addition, materials such as reactive dyes are preferably avoided in the practice of the present invention as they tend to exhibit little significant fugitivity.

In the practice of this invention, the best results are obtained by selecting acid dyes which otherwise are known to have good fugitivity from fabrics without the help of the additive. When used in the composition of the invention, such acid dyes not only have fugitivity from skin, but enhanced fugitivity from fabric as well.

In addition to the acid dye, water, and the organic sulfonate, the composition of the invention may, when in the form of a marker ink, also advantageously include a humectant, a surfactant, and a preservative. These materials and their functions are well known, and their mention here is by way of illustration only.

For example, it is desirable to include a humectant in a marker ink to retard the evaporation of water from the ink solution. This avoids unduly rapid drying of the ink in the marker nib which can cause clogging of the nib and impair the function of the marker. Typical humectants include glycerine, propylene glycol, ethylene glycol, diethylene glycol, low molecular weight (m.w.=200–400) polyethylene glycols, and mixtures of these materials. A generally useful concentration range for these humectants is from about 5% up to about 30% by weight.

Small amounts of surfactant (up to about 0.1% by weight) are also useful in marker ink compositions for the purpose of adjusting such properties as viscosity (for proper dispensing of ink through the nib), surface tension (for good flow properties without creating "strike-through"), and drying speed (for maximizing what is known as "cap-off" time; i.e., the length of time after which the nib of an uncapped marker will become clogged with dried ink). Nonionic surfactants, such as polyethylene glycol ether, alkylaryl polyether alcohol, fluorinated alkyl esters, and mixtures of such materials are preferred for use in marker inks.

Preservatives of conventional types are also advantageously employed in marker inks and tempera paints in order to extend the shelf life of the composition. Some typical preservatives useful in the present invention include methyl p-hydroxybenzoate, glutaraldehyde, and hydroxybenzoic acid esters. They are usually effective when present in an amount of from about 0.1% up to about 0.6% by weight.

TEST PROCEDURES

1. Skin Fugitivity

The fugitivity from skin of the compositions of the invention was measured by the following test:

1. Wash hands with soap and warm water. The pre-stain cleansing removes excess oil and dirt from the skin and provides a more consistent skin surface for testing. Allow the skin to dry for 30 seconds.
2. In the case of a marker, draw a stripe on the palm of the hand with the flat side of the nib. In the usual case, a ¼ inch wide by 1 inch long stripe works well. Apply enough pressure and/or multiple passes to develop a stripe with good color intensity. If it is desired to make a comparison among two or more compositions, more than one stripe may be drawn. Let stripes dry for one minute.
3. Place hand under tap and briefly rinse off excess ink with warm water.
4. Wash hands with soap in the following manner: lather using a minimum amount of soap; replace soap in soap dish; rub hands together briskly with modest pressure for 30 seconds; rinse away soap.
5. Wipe hands dry with paper towels, and complete the drying with a relatively dry towel. A dry towel will help to rub off residual traces of ink.
6. Evaluate removability from skin by assigning a score of between 1 and 5, with a score of 5 indicating essentially complete removability and a score of 1 indicating essentially no removability.
7. If removal of the marks is incomplete, repeat steps 4 through 6.

2. Fabric Fugitivity

The fugitivity from fabric of the compositions of the invention was measured by the following test.

1. Cut test swatches of a standard white 50% cotton, 50% polyester fabric to 6"×7" (15.2 cm×17.8 cm) to identify fabric direction.
2. Pre-wash swatches with bleach, non-staining water softener and ordinary household phosphate detergent powder using 120° F. hot water as directed in ASTM D4265-83.
3. Pull test swatches taut in a 12.5 cm diameter embroidery hoop.
4. Deposit marker inks dropwise onto the fabric onto a circular area about 8 cm in diameter. If the ink chromatographs to give a strongly colored ring at the circumference of the stained circle, pre-wet the fabric adjacent to the hoop with water so that inward wicking of the water counteracts the outward wicking of the ink. Permit the stained area to expand to its equilibrium diameter prior to drying.
5. Remove the stained sample from the hoop and allow to "age" for a predetermined time (usually 24 hours).
6. Staple a group of stained swatches with heavy duty staples to the edges of a bath towel. Rinse in cold water to remove excess dye.
7. Add a dummy load of unstained fabrics to provide a four pound wash load. Wash the load for 12 minutes with a hot (120° F.)/cold cycle.
8. Dry the load in a dryer.
9. Detach the test swatches from the carrier towel, iron, and measure their color on the colorimeter.

EVALUATION OF TEST DATA

Skin fugitivity data are based on a visual rating system as follows:
5=no stain
4=barely visible
3=slight
2=moderate
1=severe For each additive screened, skin fugitivity was improved over the control, which was rated at 1.5.

Fabric fugitivity data, stated in terms of ΔE values, correspond to visual observations as follows:

| | |
|---|---|
| ΔE = up to 2.2 | no visible stain |
| ΔE = 2.20–2.90 | trace |
| ΔE = 2.90–4.90 | slight |
| ΔE = 4.90–6.40 | moderate |
| ΔE = over 6.40 | heavy |

For most additives screened, at least a modest increase in fabric fugitivity was observed, though a few(the sodium alkyl benzene sulfonates) produced a decrease in fabric fugitivity.

TABLE II

| Additive Screening Test - Inks Using Acid Blue #9 | | | | | | |
|---|---|---|---|---|---|---|
| | | | | | Fabric | Skin Fugitivity |
| | | Solu- | Viscosity | | Wash Test | |
| Example | Additive | bility | (cps) | pH | (ΔE) | Wash 1 | Wash 2 |
| 1 | Control | | 1.22 | 6.40 | 4.95 | 1.50 | — |

TABLE II-continued
Additive Screening Test - Inks Using Acid Blue #9

| Example | Additive | Solubility | Viscosity (cps) | pH | Fabric Wash Test (ΔE) | Skin Fugitivity Wash 1 | Skin Fugitivity Wash 2 |
|---|---|---|---|---|---|---|---|
| 2 | Aristonate 430 | V Good | 32.20 | 12.42 | 6.42 | 2.50 | — |
| 3 | Aristonate 460 | V Good | 4.56 | 7.83 | 5.41 | 2 | — |
| 4 | Aristonate 500 | V Good | 500 | 8.49 | 9.81 | 2 | — |
| 5 | Blancol N | V Good | 2.92 | 10.48 | 2.17 | 3 | — |
| 6 | Conco Sulfate 2A1 | V Good | 1.99 | 8.47 | 4.84 | 3 | — |
| 7 | Darvan #2 | V Good | 5.24 | 7.87 | 2.05 | 3 | — |
| 8 | Darvan 404 | V Good | 3.55 | 4.76 | 2.24 | 2 | — |
| 9 | Daxad 11 | V Good | 3.02 | 10.08 | 1.58 | 4 | 4 |
| 10 | Daxad 17 | V Good | 3.07 | 8.28 | 2.07 | 4.50 | 4 |
| 11 | Daxad 19 | V Good | 4.63 | 10.28 | 1.19 | 4.50 | 4 |
| 12 | Daxad 23 | Good | 4.62 | 8.74 | 2.25 | 3.50 | 4 |
| 13 | Kara Sperse DDL | V Good | 1.59 | 8.50 | 4.60 | 2.50 | — |
| 14 | Kara Sperse DDL-12 | Good | 1.78 | 3.52 | 3.22 | 2.50 | — |
| 15 | Lomar D | V Good | 1.71 | 9.31 | 2.90 | 2.50 | — |
| 16 | Lomar LS | V Good | 2.82 | 10.44 | 2.20 | 2.50 | — |
| 17 | Petro-D-425 | Good | 3.07 | 9.67 | 4.86 | 3 | — |
| 18 | Stepantan A | V Good | 2.67 | 11.12 | 2.21 | 2.50 | — |
| 19 | Tamol SN | Good | 2.71 | 9.67 | 2 | 3.50 | 4 |
| 20 | Turkey red oil | V Good | 27.30 | 7.78 | 3.75 | 2 | — |

Following this screening carried out with an acid dye, further trials were conducted with basic and direct dyes. These trials were carried out using Tamol SN as the additive, from which a premix of 75 parts by weight of deionized water and 25 parts additive was prepared. Each trial was conducted by adding 2 parts of the dye to 50 parts of the premix by weight. A control of 4% dye in deionized water was used for each trial.

The basic dyes used were as follows:

1. C.C.C.C. Rhodamine B 500%
   Basic Violet 10
2. Textile Chemical Co. Rico
   Basic Yellow GSL-ED
3. Crompton & Knowles Corp. Sevron Brill Red
   B 200% Basic Red The direct dyes used were as follows:
1. Crompton & Knowes Corp. Direct Yellow G
   200% Direct Yellow 107
2. DuPont "Pontamine" Blue SP liquid
   Direct Blue 279
3. DuPont "Pontamine" Fast Scarlet 4B liquid
   Direct Red 236

As previously mentioned, both basic and direct dyes have characteristics which make their use less desirable in the compositions of the invention. When the inks were formulated, a clear ink was difficult to obtain with the control Basic Yellow ink. When combining basic dyes with sulfonate compounds, it is possible that a precipitate of a complex dye salt may be formed. Formation of such a precipitate is highly undesirable when the dye of the invention is to be used as a marker ink, since the precipitate would interfere with proper ink flow through the marker nib. Moreover, in the complex dye salt form, the dye may lose its coloring capacity, and its coloring capacity may only be restored when the complex salt is disassociated by exposure to elevated temperatures. Ordinary writing instruments, which are used at room temperature, are not exposed to the elevated temperatures which would be required to break down the complex dye salt.

Basic dyes as a group are also more toxic than acid dyes as a group, making them less preferable for use in compositions utilized by children. In addition, basic dyes as a group also exhibit relatively poorer light fastness. Thus precipitate formation, higher levels of toxicity, and relatively poorer light fastness render the use of basic dyes in the composition of this invention less preferred.

Direct dyes also have characteristics which make them undesirable for use in the present invention. The ink formed using Direct Yellow in combination with Tamol required boiling and stirring in order to produce a clear ink, and the resulting solution had to be tested before cooling in order to avoid the dye precipitating out of the ink solution. Such a precipitation problem, similar to that experienced with basic dyes, renders the use of direct dyes in the composition of the invention difficult at best.

Paint Compositions

As noted in the foregoing discussion, skin fugitivity is also conferred upon water soluble and water based paints by adding an organic sulfonate. Formulation and testing of such paints was carried out as set forth in the following:

A black washable tempera paint was prepared by admixing the following, all amounts given in terms of weight percent:

| Tint Base | |
|---|---|
| water | 23.79 |
| antifoam agent | 0.20 |
| Tamol SN | 10.91 |
| biocide | 1.23 |
| calcium carbonate | 33.60 |
| talc | 13.36 |
| silica | 4.11 |
| hydroxymethyl cellulose solution (2½%) | 12.80 |
| | 100.00 |
| Color | |
| Acid Blue 9 | 0.70 |
| Acid Yellow 17 | 0.52 |
| Acid Red 1 | 1.14 |

The following data were collected in skin and fabric fugitivity trials conducted using this formulation:

TABLE III

| Example | Viscosity (cps) | pH | Skin Fugitivity | Fabric Wash Test 100% cotton (ΔE) | Fabric Wash Test 50% cotton 50% polyester (ΔE) |
| --- | --- | --- | --- | --- | --- |
| 33 | 1900 | 8.07 | 3 | 1.34 | 3.46 |
| 34 | 3150 | 8.03 | — | 1.35 | 3.23 |
| 35 | 1550 | 8.91 | — | 1.42 | 3 |

Using this same tint base, other paint colors were formulated and were tested in the manner described above, except the colorimeter readings were taken through three thicknesses of fabric rather than four. The results of this testing are set out in Table IV.

TABLE IV

| Example | Color | Viscosity (cps) | pH | Skin Fugitivity | Fabric Wash Test 100% cotton (ΔE) | Fabric Wash Test 50% cotton 50% poly. (ΔE) |
| --- | --- | --- | --- | --- | --- | --- |
| 36 | yellow | 400 | 8.81 | 5 | .55 | 1.52 |
| 37 | orange | 500 | 10.03 | 5 | 1.28 | 1.97 |
| 38 | red | 400 | 9.07 | 2.50 | 6.59 | 9.48 |
| 39 | violet | 550 | 9.24 | 2 | 2.62 | 3.92 |
| 40 | blue | 400 | 9.09 | 2 | 1.01 | 1.20 |
| 41 | green | 300 | 8.80 | 3 | .35 | 1.40 |
| 42 | brown | 300 | 8.91 | 5 | 2.61 | 3.83 |
| 43 | black | 350 | 9 | 2.50 | 2.87 | 5.26 |

From the foregoing description and examples, it can be seen that the addition of at least 10% by weight of an organic sulfonate confers skin fugitivity and may enhance fabric fugitivity of such water-soluble acid dye-containing compositions as marker inks and tempera paints, and it is apparent that the objects of the present invention have been achieved. While only certain embodiments have been set forth, alternative embodiments and various modifications will be apparent to those skilled in the art. These and other alternatives are considered equivalents and within the spirit and scope of the present invention.

What is claimed is:

1. A washable dye-containing composition for imparting color to a surface comprising:
   (a) an acid dye,
   (b) a dye vehicle, and
   (c) an aromatic organic sulfonate, other than an alkyl benzene sulfonate, in an amount of at least about 10% by weight of the composition, said amount of sulfonate being sufficient to enhance the fugitivity of said composition from skin and fabric.

2. A composition according to claim 1, wherein said dye vehicle is water.

3. A composition according to claim 1, further comprising a humectant.

4. A composition according to claim 3, wherein said humectant is selected from the group consisting of glycerine, propylene glycol, ethylene glycol, diethylene glycol, low molecular weight polyethylene glycols, and mixtures thereof.

5. A composition according to claim 3, wherein said humectant is present in an amount of from about 5% to about 30% by weight.

6. A composition according to claim 1, further comprising a surfactant.

7. A composition according to claim 6, wherein said surfactant is selected from the group consisting of polyethylene glycol alkylaryl ether, alkylaryl polyether alcohol, fluorinated alkyl esters, and mixtures thereof.

8. A composition according to claim 6, wherein said surfactant is present in an amount of up to about 0.1% by weight.

9. A composition according to claim 1, further comprising a preservative.

10. A composition according to claim 9, wherein said preservative is selected from the group consisting of methyl p-hydroxybenzoate, propyl p-hydroxybenzoate, glutaraldehyde, hydroxybenzoic acid esters, and mixtures thereof.

11. A composition according to claim 9, wherein said preservative is present in amount of from about 0.1% to about 0.6% by weight.

12. A composition according to claim 1, wherein said aromatic sulfonate comprises a sodium salt of condensed naphthalene sulfonic acid.

13. A composition according to claim 1, wherein said organic sulfonate is present in an amount of from about 10% to about 25% by weight of the composition.

14. A marking instrument containing an ink, said ink comprising:
   (a) an acid dye,
   (b) water, and
   (c) an aromatic organic sulfonate, other than an alkyl benzene sulfonate, in an amount of at least about 10% by weight of the composition, said amount of sulfonate being sufficient to enhance the fugitivity of said composition from skin and fabric.

15. A method of imparting skin and fabric fugitivity to a composition containing an acid dye, comprising adding to said composition an aromatic organic sulfonate, other than an alkyl benzene sulfonate, in an amount of at least about 10% by weight of the composition, said amount of sulfonate being sufficient to enhance the fugitivity of said composition from skin and fabric.

16. An aqueous ink composition suitable for use in a marking instrument, said composition comprising:
   (a) an acid dye,
   (b) a humectant in an amount of from about 5% to about 30% by weight,
   (c) a surfactant in an amount of from 0% to about 0.1% by weight,
   (d) a preservative in an amount of from about 0.1% to about 0.6% by weight, and
   (e) an aromatic organic sulfonate, other than an alkyl benzene sulfonate, in an amount of from about 10% to about 25% by weight, said amount of sulfonate being sufficient to enhance the fugitivity of said composition from skin and fabric.

* * * * *